United States Patent
Da Silva Lopes et al.

(10) Patent No.: US 9,452,700 B2
(45) Date of Patent: Sep. 27, 2016

(54) METHOD FOR MANUFACTURING A SUSPENSION MAT

(71) Applicant: FICO CABLES LDA, Vermoim-Maia (PT)

(72) Inventors: Pedro Joao Da Silva Lopes, Paredes (PT); Manuel Antonio De Castro Faria, Gondar (PT)

(73) Assignee: FICO CABLES LDA, Vermoim-Maia (PT)

( * ) Notice: Subject to any disclaimer, the term of this patent is extended or adjusted under 35 U.S.C. 154(b) by 0 days.

(21) Appl. No.: 14/492,592

(22) Filed: Sep. 22, 2014

(65) Prior Publication Data

US 2015/0084395 A1 Mar. 26, 2015

(30) Foreign Application Priority Data

Sep. 23, 2013 (DE) .................. 10 2013 219 056

(51) Int. Cl.
| | |
|---|---|
| *B60N 2/70* | (2006.01) |
| *B68G 7/00* | (2006.01) |
| *B68G 15/00* | (2006.01) |
| *B60N 2/72* | (2006.01) |

(52) U.S. Cl.
CPC ........... *B60N 2/7017* (2013.01); *B60N 2/7094* (2013.01); *B60N 2/72* (2013.01); *B68G 15/00* (2013.01); *Y10T 29/49826* (2015.01); *Y10T 29/53* (2015.01)

(58) Field of Classification Search
CPC ............ A47C 7/28; A47C 7/30; B60N 2/72; B60N 2/7058; B60N 2/7017; B60N 2/7011; B60N 2/7047; B60N 2/7094; B68G 15/00; Y10T 29/49826; Y10T 29/53
USPC .................. 297/452.52, 452.49; 29/428, 700
See application file for complete search history.

(56) References Cited

U.S. PATENT DOCUMENTS

| | | | |
|---|---|---|---|
| 4,444,036 A | | 4/1984 | Shibata et al. |
| 4,817,551 A | * | 4/1989 | Matson ................... B63B 21/00 114/230.15 |
| 8,893,564 B2 | * | 11/2014 | Pinto Ribeiro ........ B60N 2/002 73/862.391 |
| 2015/0123806 A1 | * | 5/2015 | Kordel ................. B60N 2/7094 340/667 |

FOREIGN PATENT DOCUMENTS

| | | |
|---|---|---|
| EP | 1 780 076 A1 | 5/2007 |
| FR | 2 904 274 A1 | 7/2006 |
| WO | 2005/005193 A1 | 1/2005 |

OTHER PUBLICATIONS

Office Action and translation for corresponding German patent application No. 10 2013 219 056.5 dated Jul. 16, 2014.

* cited by examiner

*Primary Examiner* — Milton Nelson, Jr.

(74) *Attorney, Agent, or Firm* — Renner, Otto, Boisselle & Sklar, LLP

(57) ABSTRACT

A method for manufacturing a suspension mat 1, the suspension mat 1 comprising at least one wire 10 for mounting the suspension mat 1 to a seat frame 100; the method comprising the steps of (a) pushing a plastic tube 20 in a first direction 52 onto an initially straight end portion 12 of the wire 10, while setting free an uncoated outer end 14 of the straight end portion 12; (b) bending the uncoated outer end 14 of the straight end portion 12 to form an uncovered hook 16; and (c) shifting the plastic tube 20 in a second, reverse direction 54 onto the bent hook 16, such that the plastic tube 20 surrounds the bent hook 16 and forms a plastic covered hook 18. The present invention also relates to a suspension mat 1 produced in accordance with the method and an apparatus 70 for manufacturing a suspension mat 1.

13 Claims, 4 Drawing Sheets

METHOD FOR MANUFACTURING A SUSPENSION MAT

This application claims priority of German Application No. 102013219056.5 filed Sep. 23, 2013, which is hereby incorporated herein by reference.

1. FIELD OF THE INVENTION

The present invention relates to a method and an apparatus for manufacturing of a suspension mat and corresponding suspension mats itself. The related suspension mats comprise transverse wires, which terminate in hook-shaped connecting ends for mounting the suspension mat within a seat frame, particularly of a seat frame for motor vehicles.

2. BACKGROUND OF THE INVENTION

Seat suspension mats form the inner supporting structure of seats. This supporting structure supports the actual soft cushioning of the seat in a resilient manner. In seats of motor vehicles, suspension mats are usually connected to a rigid seat frame.

Figure 1:
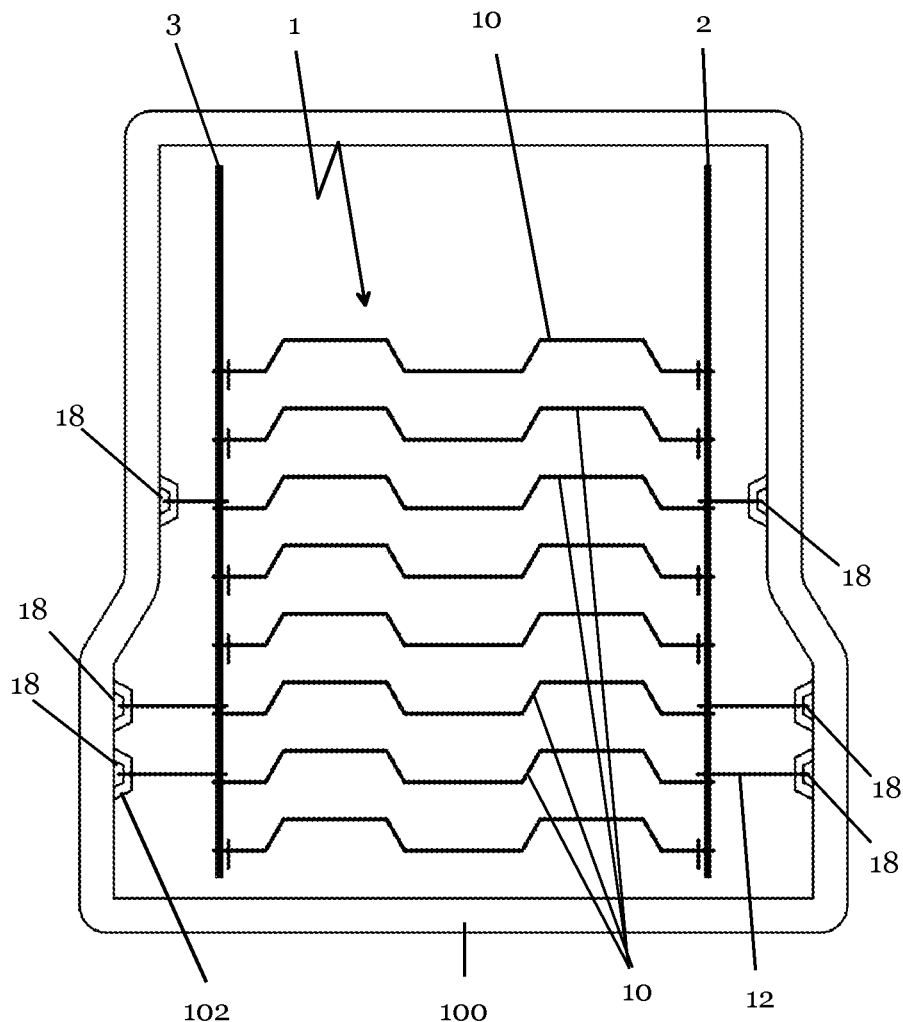

Such suspension mats are known, e.g. from EP 1 780 076 A1. The described suspension mat comprises lateral wire elements and a plurality of transverse wires. Some of transverse wires extend beyond the lateral wire elements to terminate in hook-like shaped ends. The hooks are used for mounting the suspension mat to a seat frame. Particularly, the hooks are hooked onto the seat frame. A common configuration of a suspension mat hooked into a seat frame is shown in FIG. 1 for the backrest a motor vehicle seat.

The transverse wires and the seat frame are both usually made of metal. Therefore, when force is exerted on the suspension mat, the hooks may chafe on the seat frame, thereby producing abrasion and noise. To avoid this disadvantage it is known to coat or to overmould such hooks with plastic material. However, such a coating by a kind of paint or an overmoulding in an injection moulding process is complicated and expensive.

To avoid such drawbacks the EP 1 780 076 A1 teaches to coat such hooks with a hollow plastic tube. This coating helps to prevent the noise and vibration problems. However, applying this hollow plastic tube requires pushing such plastic tube onto the initially straight end of a transverse steel wire and subsequently bending the straight end together with the hollow plastic tube. Because of the different materials, i.e. steel of the wire and plastic material of the tube, this bending process leads to heavy compression stresses on the tube which may damage the tube. Particularly, when a small bending radius of the hook is required the plastic tube is likely to be damaged or deformed during bending. This causes on the one hand mounting problems and on the other a risk of a metal to metal contact of seat frame and hook which leads to abrasion and noise.

In view of the above, it is an object of the present invention to provide a suspension mat which can be mounted to a seat frame without the danger of generation of noise and without excessive stresses and risk of damaging of the tube during the manufacturing process and use. Further, another object of the invention is to provide a manufacturing method and corresponding apparatus that avoids the above mentioned drawbacks of damaging the coat of the hooks.

3. SUMMARY OF THE INVENTION

These objects are achieved according to a first aspect of the present invention by a method for manufacturing a suspension mat according to claim 1. A second aspect of the present invention is related to a suspension mat according to claim 7. Finally, a third aspect of the present invention is related to an apparatus for manufacturing a suspension mat according to claim 11. The dependent claims define preferred embodiments of the method, the suspension mat and the apparatus, respectively.

These objects are particularly achieved by a method for manufacturing a suspension mat, wherein the suspension mat comprising at least one wire for mounting the suspension mat to a seat frame, the method comprising the steps of:
  a) pushing a plastic tube in a first direction onto an initially straight end portion of the wire, while setting free an uncoated outer end of said straight end portion;
  b) bending said uncoated outer end of said straight end portion to form an uncovered hook; and
  c) shifting said plastic tube in a second reverse direction onto said bent hook, such that said plastic tube surrounds said bent hook and forms a plastic covered hook.

This method for manufacturing a suspension mat has the advantage over the prior art, that the tube which covers the bent hook cannot be damaged by a bending procedure. Therefore, it is ensured that the suspension mat does not generate any noise when mounted within a corresponding seat frame. Further, the radius of the hook can be very small, for example down to a minimum diameter of 3 mm. This cannot be achieved by bending a wire to a hook when the wire is already covered with a plastic tube. Additionally, this manufacturing method is more cost efficient and faster than prior art methods in which the hook is covered by liquid material or over-molded by injection molding. Further, the material of the tube can easily be changed without changing the method itself, such that the material of the tube can easily be adapted to the mounting situation of the suspension mat.

Preferably the method further comprises the step of cutting a supplied plastic tube material to a desired length to form the plastic tube. The tube material can easily be provided on a stock roll and be cut by demand to the desired length immediately before the pushing step.

Preferably, during said bending step (b) said end portion is bent around a rotatable bending means. By bending only a metal wire a rotatable bending means can be used that generates hooks with a preferred round shape. No further precautions are necessary not to damage the cover material during bending.

Preferably, said pushing step (a) comprises the use of a stop means to stop the pushing movement at a desired position on the straight end portion of the wire. By means of the stop means the exact position of the plastic tube on the end portion of the wire is defined. This avoids any interference of the plastic tube with the rotatable bending means.

Preferably, said stop means is also used to perform said shifting step (c). The stop means can also serve as a shifting means to perform the shifting of said plastic tube in reverse direction onto the hook formed on the wire. Therefore, a separate shifting means can be omitted.

Preferably, said plastic tube is made from thermoplastic polyurethane (TPU) or from Poly-Oxymethylene (POM) or from thermoplastic elastomers (TPE) or from plasticized Polyvinylchloride (PVC). Such materials are preferred as cover material for the hook in view of improved noise reduction and wear resistance on the one hand and the ability to be shifted over the uncovered hook on the other hand.

Preferably, the above mentioned problems are solved by a suspension mat produced in accordance with the above described method.

Particularly, the above mentioned problems are solved by a suspension mat comprising at least one wire for mounting the suspension mat to a seat frame, wherein said wire comprises a plastic covered hook, which comprises an uncovered hook that is surrounded by a plastic tube, and wherein said plastic tube had been pushed in a first direction onto an initially straight end portion of the wire, while setting free an uncovered outer end of said straight end portion, said uncovered outer end of said straight end portion had been bent to form an uncovered hook, and said plastic tube had been shifted in a second reverse direction onto said uncovered hook, to form said plastic covered hook.

Such a suspension mat according to the invention has the advantage that the plastic covering of the hook is not damaged. Therefore, it is ensured that the suspension mat does not generate any noise when mounted within a corresponding seat frame. Further, the radius of the hook can be very small, for example down to a minimum diameter of 2 mm. This cannot be achieved by a suspension mat in which a hook is bent when the wire is already covered with a plastic tube. Additionally, such suspension mats are more cost efficient than prior art suspension mats in which the hook is covered by liquid material or over-molded by injection molding. Further, the material of the tube can easily be changed without changing the method itself, such that the material of the tube can easily be adapted to the mounting situation of the suspension mat.

Preferably said plastic tube is made from thermoplastic polyurethane (TPU) or from Poly-Oxymethylene (POM) or from thermoplastic elastomers (TPE) or from plasticized Polyvinylchloride (PVC).

Preferably, the minimum hook radius r is 2 mm-15 mm, preferably 2 mm-10 mm, more preferably 2 mm-6 mm. The minimum hook radius may depend on the wire diameter, the wire steel material and the plastic tube characteristics. Preferably, the plastic tube is held on the bent hook only by the shape of the bent hook. No further glue or securing steps are necessary.

The above mentioned problems are also solved by an apparatus for manufacturing a suspension mat, wherein the suspension mat comprises at least one wire for mounting the suspension mat to a seat frame and wherein the apparatus comprises pushing means for pushing a plastic tube in a first direction onto an initially straight end portion of a wire, stop means to stop the pushing movement of the plastic tube, said stop means is positioned to set free an uncovered outer end of said initially straight end portion, bending means for bending said uncovered outer end of said wire to form an uncovered hook, and shifting means for shifting the plastic tube in a second, reverse direction onto said uncovered hook of the wire.

The apparatus according to the invention is used to perform the above mentioned manufacturing method and to produce the above mentioned suspension mats. The apparatus is capable of bending a wire hook prior to cover the hook with a plastic tube.

Preferably, the stop means serves also as shifting means for shifting said plastic tube in reverse direction. As the stop means is simultaneously the shifting means a separate shifting means is not necessary. The apparatus is thus less complex and more cost efficient.

Preferably, the apparatus is adapted for processing a plurality of wires simultaneously. The hook bending and covering steps can be done simultaneously for a plurality of, preferably all, wires for mounting the suspension mat to a seat frame.

Preferably the apparatus further comprises a cutting means for cutting a supplied plastic tube material to a desired length to form the plastic tube. The cutting means cuts the stock plastic tube material into a plastic tube of a desired length. This is preferably done immediately before the pushing step such that material handling of the tube is made very simple. The tube material can be fed directly from a stock roll into the pushing means, held by the pushing means and can be subsequently cut by the cutting means to the desired length.

Further preferred embodiments are described in the dependent claims.

4. SHORT DESCRIPTION OF THE ACCOMPANYING DRAWINGS

Figure 2A:
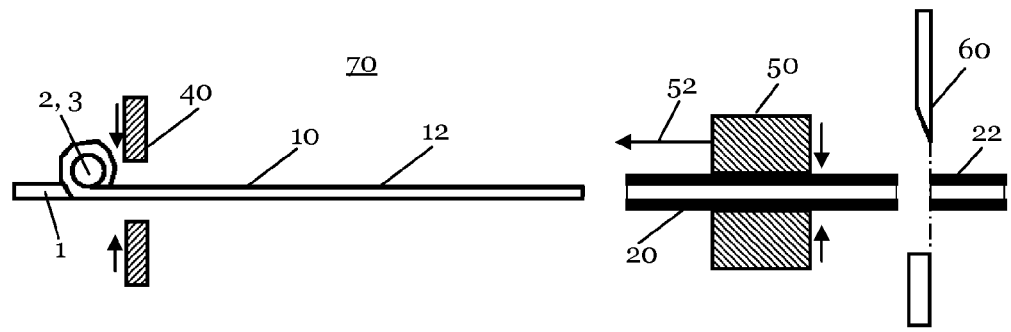
Figure 2B:
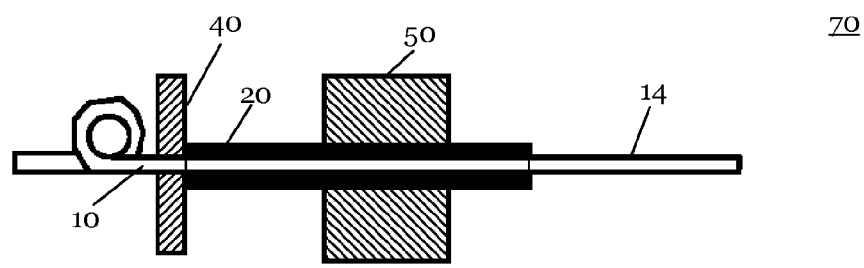
Figure 2C:
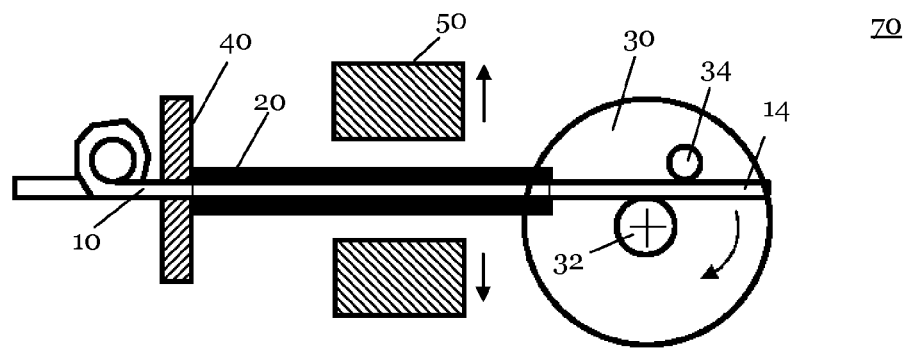
Figure 2D:
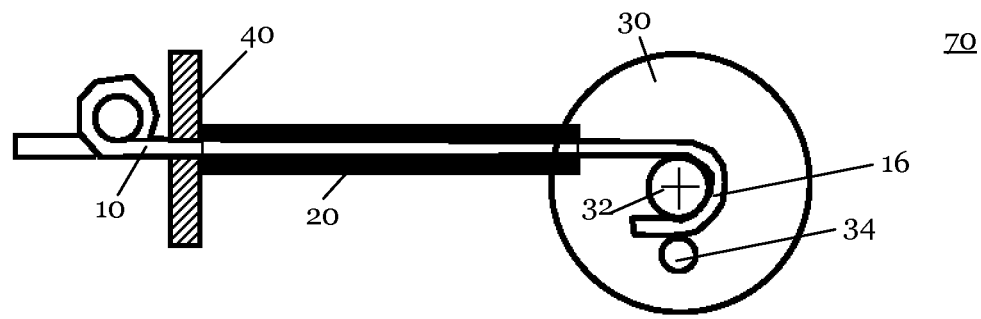
Figure 2E:
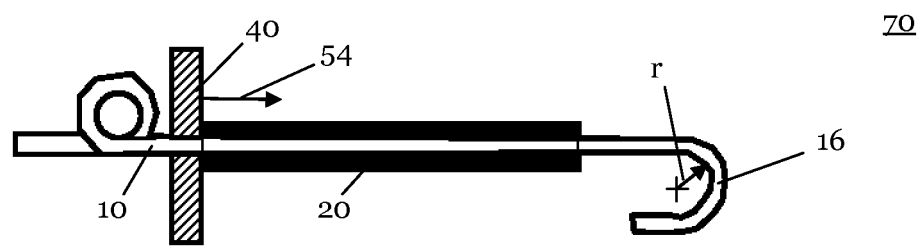
Figure 2F:
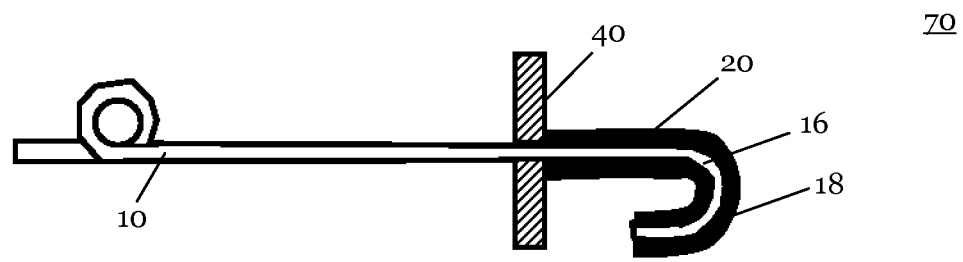
Figure 2G:
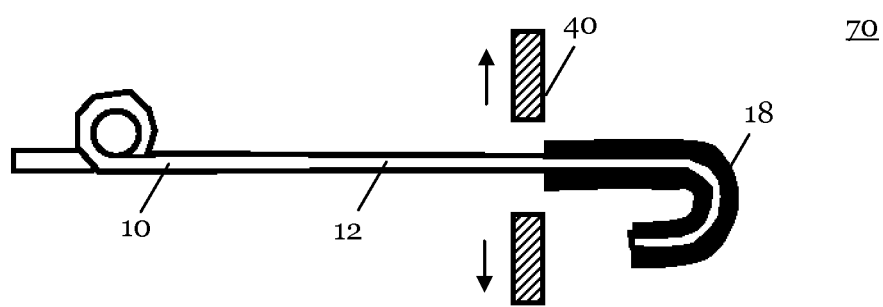

The present invention is described with reference to the accompanying drawings in which shows:

FIG. 1 an embodiment of a suspension mat according to the invention mounted in a seat frame;

FIG. 2A a schematic illustration of a cutting and pushing step of a preferred embodiment of the present invention and an apparatus therefore;

FIG. 2B a schematic illustration after the pushing step of a preferred embodiment of the present invention and an apparatus therefore;

FIG. 2C a schematic illustration of a preferred embodiment of the present invention and an apparatus therefore;

FIG. 2D a schematic illustration after the hook bending step of a preferred embodiment of the present invention;

FIG. 2E a schematic illustration of the shifting step of a preferred embodiment of the present invention and an apparatus therefore;

FIG. 2F a schematic illustration after the shifting step of a preferred embodiment of the present invention and an apparatus therefore; and FIG. 2G a schematic illustration after the shifting step of a preferred embodiment of the present invention with plastic covered hook and an apparatus therefore.

5. DETAILED DESCRIPTION OF THE PREFERRED EMBODIMENTS

In the following preferred embodiments of the present invention are described with respect to the figures.

FIG. 1 shows a seat frame 100 in which a suspension mat 1 according to the invention is mounted. In the shown only exemplary embodiment the suspension mat 1 comprises two lateral wires 2 and 3 and a plurality of transversal wires 10, which are rigidly connected to the lateral wires 2 and 3. The wires 2, 3 and 10 form a grid-like resilient structure of the suspension mat 1. To provide resilience, the wires 10 comprise in the area between the wires 2 and 3 a curved or zigzag shape such that the suspension mat can expand in transverse direction under load. For mounting such a suspension mat 1 to the seat frame 100 some of the transversal wires 10 extend beyond the lateral wires 2 and 3 and terminate in plastic covered hooks 18. The suspension mat 1 is mounted to the seat frame 100 by hooking-in the plastic covered hook 18 into the corresponding receptacles 102 on the seat frame 100. Preferably, this can be done by expanding the suspension mat 1 in transverse direction while mounting.

In the preferred embodiment of FIG. 1 the suspension mat 1 comprises six hooks 18 which terminate in six ends of three wires 10 that are used for the mounting of the suspension mat 1 within the seat frame 100. Other configurations of a suspension mat 1 with other numbers of plastic covered hooks 18 are of course possible and encompassed by the present invention.

FIGS. 2A-2G illustrate the manufacturing steps and a corresponding apparatus 70 for manufacturing a suspension mat 1 with plastic covered hooks 18. The FIG. 2A-2G only show one wire 10 extending beyond lateral wires 2 or 3. However, it is to be understood that the apparatus 70 according to the invention may process all six hooks 18 of the exemplary embodiment of FIG. 1 simultaneously and thus comprises six times the elements shown in FIGS. 2A-2G.

FIG. 2A shows a wire 10 for mounting the suspension mat 1 to a seat frame 100. The wire 10 ends in an initially straight end portion 12. The wire 10 is made preferably of an ordinary steel wire. FIG. 2A further shows a plastic tube 20 held by a pushing means 50. The plastic tube 20 has a certain length and is produced by cutting off a certain length of tube material 22 from a supplied plastic tube material 22 by means of a cutting means 60.

In a first pushing step, shown in FIG. 2A and FIG. 2B, the plastic tube 20 is pushed in a first direction 52 onto the initially straight end portion 12 of the wire 10 by the pushing means 50. As one can see in FIG. 2B, the plastic tube 20 is pushed until it reaches a stop means 40 which is closed to attach and hold the wire 10. Since the length of the tube 20 is shorter than the length of the initially straight end portion 12 of the wire 10, the pushing step sets free an uncovered outer end 14 of the end straight portion 12. The stop means 40 guarantees the length of the uncoated outer end 14. After the plastic tube 20 is fully pushed into the first direction 52 onto the initially straight end portion 12, the pushing means 50 is released from the tube 20 and a rotatable bending means 30 is moved into contact with the uncovered outer end 14 of the wire 10 as it can be seen in FIG. 2C.

As it can be seen in FIG. 2C the rotatable bending means 30 comprises a hub 32 which defines the inner diameter r of the hook 16 and a pin 34 which rotates around the hub for bending the initially straight end portion 12 of the wire 10 in order to form an uncovered hook 16. FIG. 2D shows the condition after the hook 16 is bent by the rotatable bending means 30. Since only the uncovered outer end 14 of the wire 10 is bent to an uncovered hook 16 a damaging of the plastic tube 20 is excluded. Further, the hook's radius can be made very small. As shown in FIG. 2D the minimum hook radius r can be 2 mm-15 mm, preferably 2 mm-10 mm and more preferably 2 mm-6 mm. Therefore, the minimum possible hook radius r is smaller than the minimum possible hook radius of prior art suspension mats.

As it can be seen in FIG. 2E subsequently the bending means 30 is moved away from the hook 16. FIG. 2E and FIG. 2F show the shifting step, in which said plastic tube 20 is shifted in a second, reverse direction 54 onto said bent uncovered hook 16 by means of a shifting device 40. In the preferred embodiment the stop means 40 is also used to perform said shifting step and is thus considered as the respective shifting means 40. As it can be seen in FIG. 2F the shifting means 40 shifts the plastic tube 20 into a second, reverse direction 32 until the tube fully covers uncovered hook 16 and thus forms a plastic covered hook 18. Thereby, the second, reverse direction 54 is reverse to the first direction 52.

Finally, as it is shown in FIG. 2G the shifting means 40 releases wire 10 and the suspension mat 1 is obtained comprising at least one wire 10 having a plastic covered hook 18.

The plastic tube 20 can be made preferably from thermoplastic polyurethane (TPU) or from Poly-Oxymethylene (POM) or from thermoplastic elastomers (TPE) or from plasticized Polyvinylchloride (PVC). The material of the plastic tube 20 should be resilient to be bent when shifted onto the bent hook 16. Preferably, the plastic tube 20 of the plastic covered hook 18 is held only by the shape of the bent hook 16. Therefore, no glues or other fixing means are required.

LIST OF REFERENCE SIGNS 1 suspension mat
2, 3 lateral wires
10 transversal wire
12 straight end portion the wire
14 uncovered outer end of wire
16 uncovered hook
18 plastic covered hook
20 plastic tube
22 plastic tube material
30 rotatable bending means
32 hub
34 pin
40 stop means and shifting means
50 pushing means
52 first direction
54 second, reverse direction
60 cutting means
70 apparatus
100 seat frame
102 receptacle

The invention claimed is:

1. A method for manufacturing a suspension mat, the suspension mat comprising at least one wire for mounting the suspension mat to a seat frame; the method comprising the steps of:
   a) pushing a plastic tube in a first direction onto an initially straight end portion of the wire, while setting free an uncoated outer end of said straight end portion;
   b) bending said uncoated outer end of said straight end portion to form an uncovered hook; and
   c) shifting said plastic tube in a second, reverse direction onto said bent hook, such that said plastic tube surrounds said bent hook and forms a plastic covered hook.

2. The method according to claim 1, wherein said plastic tube is made from thermoplastic polyurethane or from Poly-Oxymethylene or from thermoplastic elastomers or from plasticized Polyvinylchloride.

3. The method according to claim 1, wherein said pushing step (a) comprises the use of a stop to stop the pushing movement at a desired position on the straight end portion of the wire.

4. The method according to claim 3, wherein said stop is also used to perform said shifting step (c).

5. The method according to claim 1, wherein during said bending step (b) said end portion is bent around a rotatable bending device.

6. The method according to claim 5, wherein said pushing step (a) comprises the use of a stop to stop the pushing movement at a desired position on the straight end portion of the wire.

7. The method according to claim 6, wherein said stop is also used to perform said shifting step (c).

8. The method according to claim 1, further comprising the step of cutting a supplied plastic tube material to a desired length to form the plastic tube, said cutting step being carried out before said pushing step (a).

9. The method according to claim 8, wherein during said bending step (b) said end portion is bent around a rotatable bending device.

10. The method according to claim 8, wherein during said bending step (b) said end portion is bent around a rotatable bending device.

11. The method according to claim 8, wherein said plastic tube is made from thermoplastic polyurethane or from Poly-Oxymethylene or from thermoplastic elastomers or from plasticized Polyvinylchloride.

12. The method according to claim 8, wherein said pushing step (a) comprises the use of a stop to stop the pushing movement at a desired position on the straight end portion of the wire.

13. The method according to claim 12, wherein said stop is also used to perform said shifting step (c).

\* \* \* \* \*